United States Patent [19]

Luzsicza

[11] Patent Number: 5,540,420
[45] Date of Patent: Jul. 30, 1996

[54] METHOD OF MAKING A BEARING STRUCTURE AND BEARING SO MADE

[75] Inventor: Steven O. Luzsicza, Huron, Ohio

[73] Assignee: Clevite Elastomers, Milan, Ohio

[21] Appl. No.: 254,984

[22] Filed: Jun. 7, 1994

[51] Int. Cl.⁶ .................................................. F16F 7/00
[52] U.S. Cl. .......................................................... 267/141.1
[58] Field of Search ................................... 29/447, 897.2,
29/898.055, 898.054, 898.15; 267/30, 141,
141.1, 141.5, 258, 270, 276, 153, 154,
279, 281; 301/131; 384/125, 215, 276,
282, 285, 297, 300

[56] References Cited

U.S. PATENT DOCUMENTS

| | | | |
|---|---|---|---|
| 2,702,730 | 2/1955 | Ivanoff et al. | 29/898.055 X |
| 3,194,614 | 7/1965 | Thomas | 308/26 |
| 3,238,601 | 3/1966 | White | 384/276 |
| 4,137,618 | 2/1979 | Krauss | 29/898.055 X |
| 4,491,429 | 1/1985 | Matoba et al. | 384/221 |
| 4,667,943 | 5/1987 | Izumi et al. | 267/141.3 |
| 4,671,678 | 6/1987 | Munch | 384/125 |
| 4,744,677 | 5/1988 | Tanaka et al. | 267/279 X |
| 5,058,867 | 10/1991 | Hadano et al. | 267/141.3 |
| 5,062,654 | 11/1991 | Kakimoto et al. | 280/673 |
| 5,080,334 | 1/1992 | Mihara et al. | 267/281 X |
| 5,143,457 | 9/1992 | Langhof et al. | 384/276 |
| 5,286,014 | 2/1994 | Chakko | 267/293 |

FOREIGN PATENT DOCUMENTS

| | | |
|---|---|---|
| 0485697A3 | 5/1992 | European Pat. Off. . |
| 0497701A1 | 8/1992 | European Pat. Off. . |
| 2645930A1 | 10/1990 | France . |
| 2358225 | 7/1975 | Netherlands . |

Primary Examiner—Robert J. Oberleitner
Assistant Examiner—C. T. Bartz
Attorney, Agent, or Firm—William Squire

[57] ABSTRACT

A steel inner tube and thermoplastic outer tube are placed in an injection mold apparatus and a thermoplastic intermediate tube is molded between the inner and outer tubes. The intermediate tube shrink fit locks to the inner tube and shrinks relative to the outer tube to provide a selected journal-bearing torque relation therebetween. Projections and mating recesses on the inner tube and intermediate tube facilitate locking the intermediate tube to the inner tube without adhesives or other bonding agents. One or more thrust rings and recesses are formed on the mating surfaces of the outer tube and intermediate tube to preclude axial relative displacement therebetween in response to axial thrust loads. An elastomeric tubular member (or other known bushing construction) is secured over the outer tube and an outer steel tube is over the elastomeric member to provide an enhanced control arm bushing with a predetermined torque response for automotive suspension systems.

23 Claims, 2 Drawing Sheets

METHOD OF MAKING A BEARING STRUCTURE AND BEARING SO MADE

BACKGROUND OF THE INVENTION

This invention relates to a journal and bearing therefore, and more particularly, to assemblies for use in automotive suspension systems.

In an automotive front suspension system, the front wheels are secured to a corresponding front axle which is secured to a spindle. The spindle is connected to an upper and a lower arm by respective ball joints. The upper and lower arms, in turn, are connected to the automotive chassis by upper and lower control arm bushings. These bushings utilize elastomeric material and have a significant effect on ride, comfort, handling characteristics, road noise and vibration isolation. These bushings are torsional spring type devices with limited oscillatory capability and parasitic torsional spring rate. The bushings comprise three components: A rubber element compressed between two metal sleeves. The rubber element is secured by high compression or is chemically bonded to one or both sleeves, which are steel tubes. The rubber element is used to perform several functions simultaneously, i.e., provide vibration damping or isolation and rotary motion between the inner and outer sleeves, and thus poses conflicting material development and design problems. As a result there is a need for cost effective, low torsional rate tunable isolation pivot joints to replace currently used torsional spring type rubber bushings.

To fill this need, numerous devices have appeared commercially, applying new principles, but none have met the requirements for performance, economy and low torsional rate tunable isolation suspension in pivot joints such as in the control arm bushings mentioned above. Low torsional rate is required between the inner and outer sleeves to reduce parasitic loads induced by a solid elastomeric element when one portion is rotated relative to another portion as occurs in suspension applications.

Some prior art designs include Teflon cloth lined rubber bushings and a silicone grease lubricated rubber bushing. Although both devices are based on a sliding bearing principle, none offer a relatively low torque friction and load carrying capacity needed. For example, FIG. 5 illustrates various bushings at static no load conditions. Curve a illustrates a torsional spring oscillatory bushing comprising a rubber block between inner and outer tubes locked together by high compression as manufactured by the assignee of the present invention. This bushing exhibits 13 in.-lb./degree of parasitic torque response.

Curve b illustrates the characteristics of a dual torsional spring oscillatory bushing referred to as a duplex bushing using several solid rubber elements and steel tubes and exhibits a parasitic torque response of 8 in.-lb./degree. Curve c illustrates a Teflon cloth lined rubber bushing providing a sliding bearing. This bushing exhibits 120 in.-lb. of running torque. Curve d illustrates the characteristics of another product of the assignee of the present invention comprising silicone lubricated rubber sliding on a steel or plastic journal. This bushing exhibits 70 in.-lb. of running torque. All of the above exhibit too high a running torque response and objectionable break-away torque for certain automotive suspension system applications, such as in the control arm bushings described above.

Generally, bushings currently available are rubber embedded, grease lubricated, or plastic on metal wherein the plastic is premolded to the desired dimensions and assembled in mating metal components such as used in certain ball joints, or still other arrangements. All require high surface finish and close tolerance corrosion protection, and are relatively costly. The present inventor recognizes a need for a low cost, low torsional rate tunable bushing, e.g., responsive to torques below 25 in.-lb., and which can carry relatively high loads and is durable.

A method of making a bearing structure according to the present invention comprises forming a first member with a first surface of a first radial dimension relative to a first axis; forming a second member having a second surface with a second radial dimension smaller than the first radial dimension relative to a second axis; positioning the first member relative to the second member with the first and second surfaces forming an interface region in facing spaced relation and the axes coaxial; and molding an intermediate thermoplastic journal member between the first and second surfaces and which rotates relative to at least one of the first and second members.

The method according to one embodiment comprises shrink fitting the intermediate member to the second member to preclude relative rotation therebetween in response to a torque applied between the first and second members and shrinking the intermediate member relative to the first member first dimension to form the intermediate and first members into a respective journal and bearing.

In accordance with a further embodiment, the members are tubular.

In a further embodiment, the method includes forming at least one projection on one of the first and second members and at least one mating recess engaged with the projection on the intermediate member at the interface therebetween to form an axial thrust absorbing arrangement.

IN THE DRAWING

Figure 1:
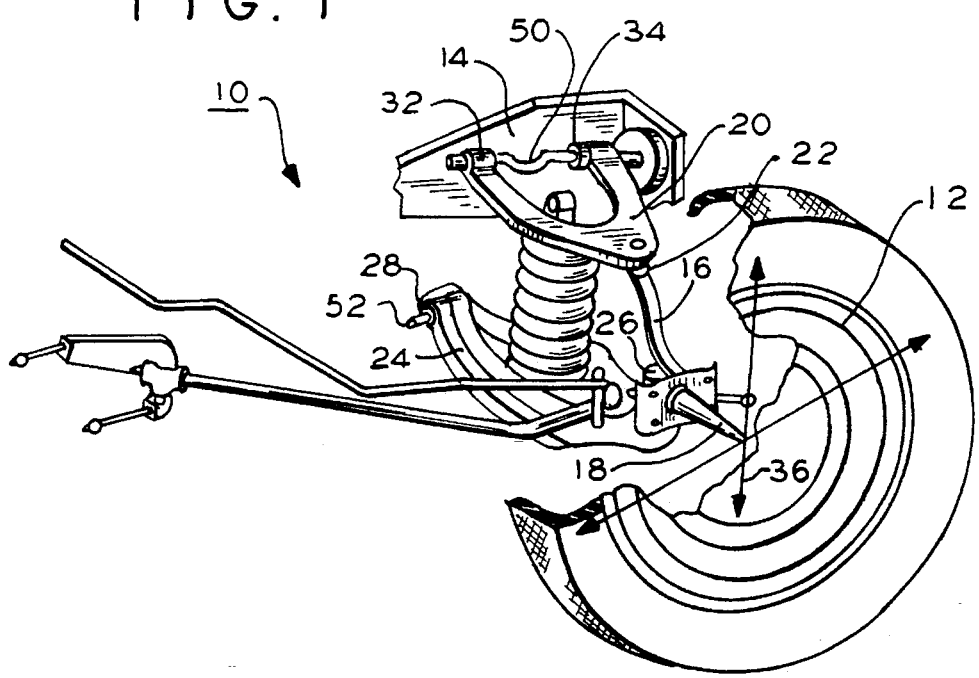
FIG. 1 is an isometric view of a portion of a vehicle front suspension system.

In FIG. 1 a representative automobile front suspension system 10 is illustrated for securing a wheel 12 to a chassis 14. System 10 includes a spindle 16 to which an axle 18 is secured for receiving wheel 12. The spindle 16 is secured to upper arm 20 via upper ball joint 22 and to lower arm 24 via lower ball joint 26. Lower control arm bushing 28 rotatably secures the lower arm 24 to the chassis 14. The upper arm is secured to the chassis 14 by way of upper control arm bushings 32 and 34.

The bushings 28, 32 and 34 permit the arms 20 and 24 to pivot about horizontal axes so that wheel 12 may displace vertically in directions 36. The bushings 28, 32 and 34 typically in the prior art comprise solid rubber material used in combination with inner and outer metal sleeves, wherein the outer sleeve is rotatable relative to the inner sleeve, and as described more fully in the introductory portion. These bushings also absorb radial induced loads and provide noise and vibration damping between the spindle 16 and the chassis 14.

Figure 2:
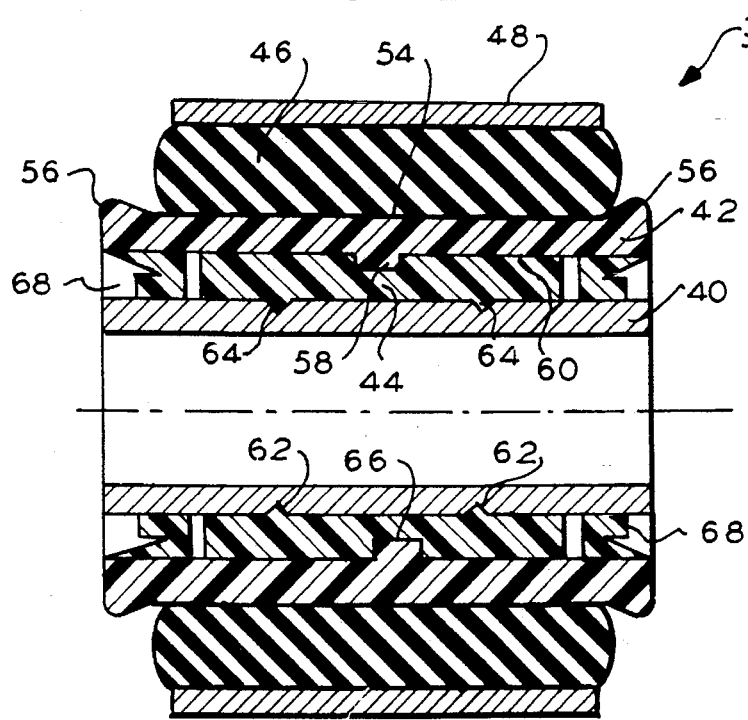
FIG. 2 is an elevation sectional view of a bearing structure according to one embodiment of the present invention.

In FIG. 2, bearing structure 38 according to one embodiment of the present invention is utilized as a control arm bushing. Structure 38 includes an inner tubular member 40, preferably steel, an outer tubular member 42 which may be thermoplastic or steel, but in this embodiment is thermoplastic, an intermediate thermoplastic tubular member 44 and an outer cylindrical elastomeric tubular member 46. A further steel tube 48 is external to the member 46. The outer most tube 48 is press fit connected to an upper or lower arm such as arms 20 and 24, respectively, in FIG. 1, via a bore in the corresponding arm. The inner tubular member 40 is connected to a shaft passing therethrough such as link 50, or bolt 52, FIG. 1, which link and bolt are secured to the chassis 14.

When the wheel 12, moves in directions 36, the arms 20 and 24 rotate about the axes of the inner member 40 fixed to the link or bolt, rotating the outer member 42 about the corresponding axis.

In FIG. 2, the outer tubular member 42 is a circular cylindrical sleeve with a concave outer surface 54. Surface 54 is generally circular cylindrical except for annular ribs 56 at opposite edges of the member 42 forming the concavity. The elastomeric member 46 is circular cylindrical and is seated on surface 54 between the ribs 56. A circular ring-like rib 58 is molded integral with the member 42 and extends into the bore 60 of member 42. Bore 60 is otherwise formed by a circular cylindrical surface.

Member 42 is preferably thermoplastic, but in the alternative in other implementations, could be steel. The elastomeric member 46 is preferably locked to the member 42 by high compression in which the member 46 is forced axially onto the member 42 and within the bore of tube 48 using a funnel device in a process employed for other commercially available bushings. Adhesives or other bonding arrangements may be used in the alternative to secure the member 46 within the bore of tube 48 and to the member 42.

The elastomeric member 46 in this embodiment is shown as a solid elastomeric structure. In the alternative, the elastomeric member could be of the type having fluid cavities to provide fluid damping in a known manner. In these systems a hydraulic fluid is utilized in the elastomer member cavities to provide further isolation.

When member 42 is made of thermoplastic, it is formed of so called engineering plastics which are relatively high strength and high melt temperature materials. For example, member 42 may be glass reinforced polyetherimide resin such as manufactured by General electric Company under the name ULTEM 2,300 or 4,000 series bearing grade material. This resin has a relatively high compressive strength, e.g., 550,00 PSI and a high glass transition temperature Tg of 419° F., high heat deflection temperature 392° F. at 264 PSI and low coefficient of friction (0.25 on steel) with a melt temperature of about 700°–800° F. These properties are important for reasons explained below.

For high pressure-velocity (PV) applications, the member 42, in the alternative, may comprise higher heat conductive material, i.e., stainless steel. The metal member minimizes temperature and moisture induced wall thickness variation and also facilitates improved press fit conditions in mating components for field installations. The particular inner bore 60 configuration is provided in accordance with a given implementation. For example, the rib 58 provides axial thrust coupling to the intermediate member 44. In other implementations where no axial thrust forces are present the rib 58 may be omitted or further ribs may be provided as will be explained in connection with the embodiment of FIG. 4. Other interconnecting surface features such as splines or other kinds of projections may be used according to such different implementations.

The intermediate member 44 is formed in a unique manner to provide the desired characteristics of the bearing bushing 38 structure. The member 44 is preferably a circular cylindrical tube and is molded in situ between the outer member 42 and the inner member 40. This molding provides the member 44 with the exact mating dimensions with respect to members 40 and 42 needed for a given structure 38 operating characteristics and properties.

The member 44 is preferably formed of acetal resin having a melt temperature of 400° F. which is substantially below the melt temperature of the polyetherimide melt temperature of 800° F. This temperature differential is significant because the lower temperature is sufficiently lower so that no fusion occurs between the two plastics when the thermoplastic molten acetal resin is injected into the region between members 40 and 42. Acetal resin has other desirable properties of compatible friction with the polyetherimide, low moisture absorption and relatively high compressive strength. The dynamic and static friction coefficients are the same and could be reduced by blending lubricants, such as silicone or Teflon into the material. Other thermoplastic materials may include polycarbonates and polyesters which are used in high load, low speed oscillating applications.

Other significant factors in the selection of the materials is the thermal shrink coefficient and tensile strength ratio. The thermal shrink coefficient must be of such a value wherein the member 44 shrinks sufficiently so as to create a sufficient compressive force on the inner member 40 to lock securely to member 40. However, this shrinkage must not induce such a large load on the member 44 so as to exceed the material's tensile strength. Excessive shrink and low tensile strength can create cracks and defeat the purpose of this structure.

To enhance this locking action of the member 44 to inner member 40, member 40 is preferably formed with a pair of annular grooves which are triangular in this embodiment. The plastic intermediate member 44 when molded to the member 40 is automatically formed with mating ribs 64. Also, member 44 when molded in situ is automatically formed with an annular recess 66 which is an identical mirror image of annular rib 58 in the inner bore 60 of member 42. No adhesives or other bonding agents are used to lock the intermediate member 44 to the inner tubular member 40.

This locking action is sufficient such that any relative torque between outer member 42 and inner member 40 results in the intermediate member 44 rotating in unison with the inner member 40 as an integral structure. In contrast, the intermediate member shrinks relative to the inner bore 60 diameter of the outer member 42 so as to permit rotational slip fit therebetween when subjected to the same relative torque. This is important because the relative torque can be preset to a desired value by selecting the shrinkage characteristics of the member 44 material and the pressure of the molding step so as to effect the desired dimensional and stress relation between the members 42 and 44.

To assure the desired bearing function between the members 44 and 42 where an outer elastomeric member 46 is compressively attached to the member 42, the outer member 42 hoop strength must withstand the compressive pressure exerted by the compressed elastomeric member 46. The polyetherimide resin has such capabilities. Where a higher pressure is employed than that sustainable by the resin, then a stainless steel tube would be used for member 42.

Figure 3:
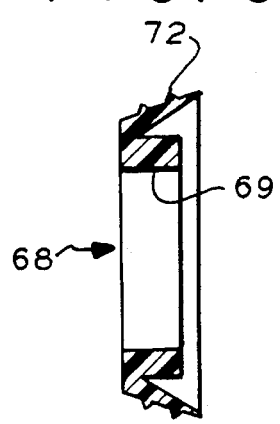
FIG. 3 is a sectional elevation view of an end seal used in the embodiment of FIG. 2.

The structure 38 includes a pair of end seals 68. In FIG. 3, seal 68 comprises a circular ring portion 69 and an outer flap portion 72 formed as an integral member from thermoplastic material. The seal 68 is press fitted into each structure end as shown in FIG. 2 between member 42 and member 40 coextensive with member 44.

In operation, the outer and inner members 42 and 40, respectively, are formed separately. These members are then assembled in nested relation in the desired configuration in a thermoplastic mold apparatus. A sleeve (not shown) is assembled to the assembly thus far described in place of one of the end seals 68 to define the length of the intermediate member 44. Then, using conventional molding techniques, the intermediate member is formed by injection molding thermoplastic material in the space between the outer and inner members 42 and 44. The member 44 thus formed is identical to the shape and surface characteristics of the mating surfaces. The relative cooler temperature of the molten plastic forming member 44 does not soften or fuse to the outer member 42 which remains solid.

The molded ribs 58 and 64 are formed simultaneously and in engagement with the corresponding recesses. The shrinkage of the member 44 locks it to the inner member 40 under compressive load. This shrinkage reduces the outer diameter of the intermediate member 44 somewhat to provide sliding bearing relation between these mating surfaces. By controlling the amount of shrinkage, the relative torque needed to slide the outer member 42 over the intermediate member is settable in accordance with a given material used for member 44, the material selected determining the amount of shrinkage in a known manner.

Figure 5:
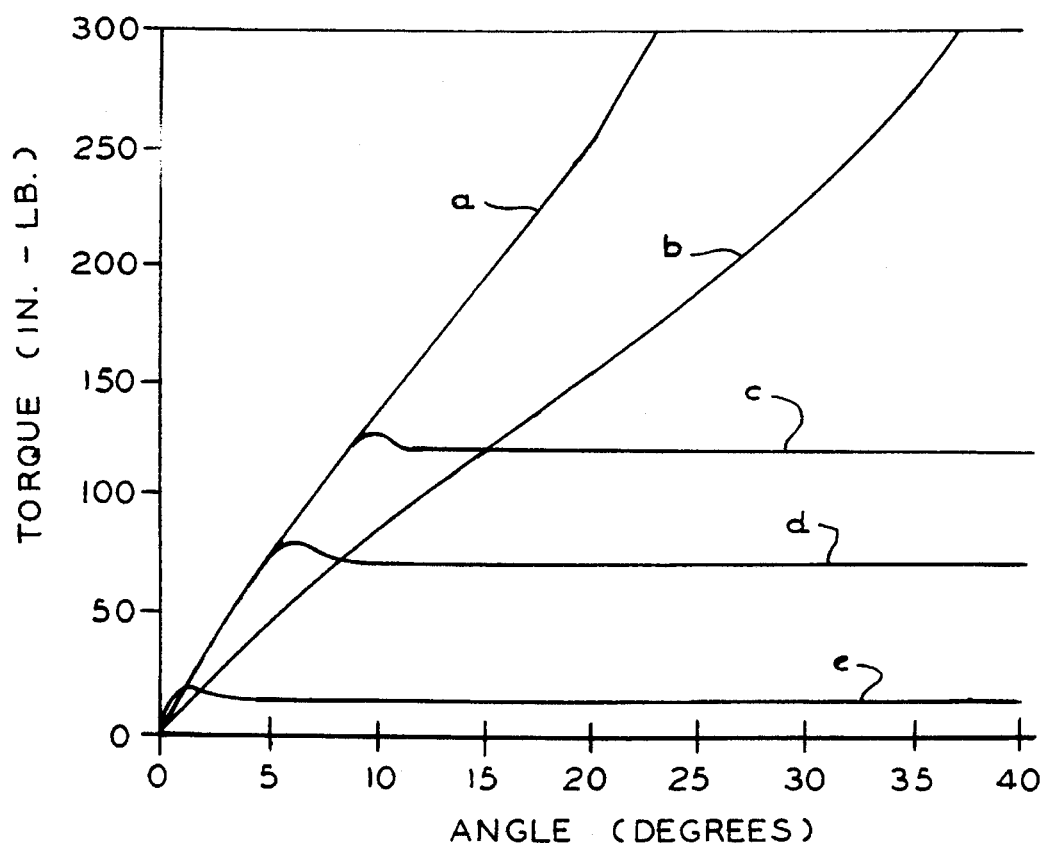
FIG. 5 is a chart useful for explaining some of the principles of the present invention.

In FIG. 5, the relative torque of the structure 38 as compared to prior art bushings is shown. Curve e shows the running torque of structure 38 which is significantly lower than that of the prior art bushings described in the introductory portion and represented by curves a–d. Curve e shows a running torque of about 15 in.-lb. This is significantly lower than the other devices described manifested by curves a–d. As a result, relatively negligible torque is applied to the elastomeric member 46 minimizing undesired parasitic torque therein when member 40 is rotated relative to member 42. Significantly, various torque magnitudes may be provided between member 40 and 42 by utilizing the member 42 diametral hoop elasticity, in compression or tension, during the molding of the member 44. That is, by providing different mold pressures, the compression or tension of the member 42 may be preset to desired values to effect the relative torque magnitude between the adjacent members. This selection of torque may also be determined by selection of different materials that provide the desired properties.

While the bearing structure described herein is preferred for automotive suspension systems, the cartridge comprising members 40, 42 and 44 is adaptable to other oscillatory or intermediate duty rotary bearing implementations.

The rib 58 and recess 66 provide axial thrust resistance for those instances where axial thrust is present. Where axial thrust is not a problem then the projection 58 and rib 66 need not be present. The ribs 62 and grooves 64 serve to provide enhanced locking action between the inner member 40 and the plastic molded member 44.

Figure 4:
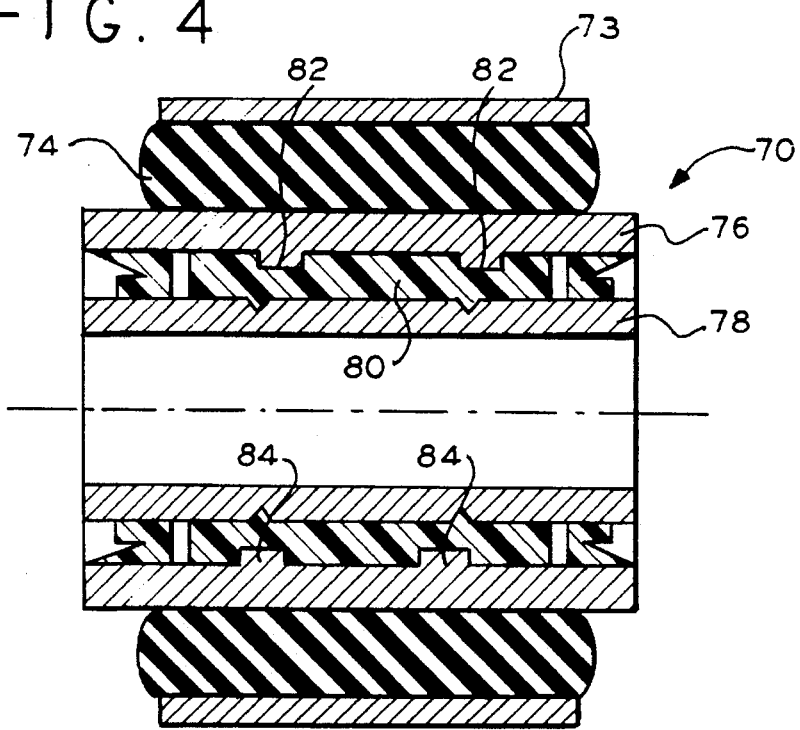
FIG. 4 is an elevation sectional view of a bearing structure according to a second embodiment of the present invention.

In FIG. 4, an alternative embodiment is shown comprising a bearing structure 70. Structure 70 includes a circular cylindrical metal sleeve 73, an elastomeric cylindrical member 74, an outer metal tubular member 76, an inner tubular metal member 78 and an intermediate thermoplastic tubular member 80. The member 80 is formed similarly as member 44, Fig.2. The difference is that two parallel annular spaced recesses 82 are formed in member 80 and two annular mating ribs 84 are formed on the surface of outer tubular member 76. The ribs 84 and recesses 82 provided increased resistance to axial thrust loads between the member 76 and member 78. A further difference is that the outer member 76 is steel as compared to plastic material for outer member 42, FIG. 2.

The thermoplastic member 80 is formed by injection molding plastic material between the outer tubular member 76 and inner member 78 as previously described in connection with the embodiment of FIG. 2.

In a further embodiment, the members may have mating spherical surfaces rather than tubular cylindrical surfaces. Also, the surfaces need not be annular but may be portions of a cylinder or sphere. The significant aspect is that the intermediate journal member is molded in situ between the outer and inner members to provide the desired characteristics of the structure. In certain implementations, the elastomeric member may not be utilized, the mating support structures being secured directly to the inner tubular member 40, FIG. 2, and to the outer member 42.

It will occur to one of ordinary skill that various modifications may be made to the described structures. It is intended that the description be by way of illustration and not limitation. The scope of the invention is as defined in the appended claims.

What is claimed is:

1. A method of making a bearing structure comprising:
   forming an outer tubular member having a cylindrical inner surface comprising a bore of a first diameter;
   forming an inner tubular member having an outer cylindrical surface with an outer diameter smaller than the first diameter;
   positioning the inner tubular member within the outer member bore; and
   forming an intermediate thermoplastic molded tubular member by molding thermoplastic material in situ between the inner and outer tubular members to shrink fit lock the intermediate member to the inner member so that the inner and intermediate members rotate in unison when subjected to a torque between the inner and outer members and to form the intermediate member and the outer member as a respective bearing and journal when subjected to said torque.

2. The method of claim 1 including forming at least one projection on one of said inner and intermediate tubular members at the interface therebetween and at least one mating recess engaged with the projection on the other of said inner and intermediate tubular members at the interface.

3. The method of claim 2 wherein the forming the at least one projection includes forming at least one annular rib.

4. The method of claim 1 including forming at least one projection on one of said outer and intermediate tubular members at the interface therebetween and at least one mating recess engaged with the projection on the other of said outer and intermediate tubular members at the interface.

5. The method of claim 1 wherein the forming the outer and intermediate tubular members includes forming the intermediate member with a second outer diameter different than the first diameter such as to provide a given torque rotational response of the intermediate member relative to the outer member.

6. The method of claim 1 wherein the forming the outer tubular member includes forming the outer member of thermoplastic material.

7. The method of claim 1 wherein the forming the inner and outer tubular members includes forming the inner and outer members of metal.

8. The method of claim 1 further including forming an elastomeric member with a bore, positioning the outer tubular member in the elastomeric member bore and positioning the elastomeric member in the bore of an outer metal tube.

9. The method of claim 6 including forming the outer tube member of a first thermoplastic of a first melt temperature and forming the intermediate member of a second thermoplastic different than the first thermoplastic and of a lower melt temperature than the first melt temperature so that molding the intermediate member does not melt or soften the outer member.

10. A method of making a bearing structure comprising:

forming a first member with a first surface of a first radial dimension relative to a first axis;

forming a second member having a second surface with a second radial dimension smaller than the first radial dimension relative to a second axis;

positioning the first member relative to the second member with the first and second surfaces forming an interface region in facing spaced relation and the axes coaxial; and molding an intermediate thermoplastic journal member in situ between the first and second surfaces and which slides against at least one of the first and second members;

forming the intermediate member including shrink fitting the intermediate member to the second member to preclude relative rotation therebetween in response to a torque applied between the first and second members and shrinking the intermediate member relative to the first member first dimension to form the intermediate and first members into a respective journal and bearing.

11. The method of claim 10 including forming mating projections and recesses in the intermediate and first and second members.

12. The method of claim 10 including forming at least one projection on one of said first and second members at the interface therebetween and at least one mating recess on the intermediate member and engaged with the projection.

13. The method of claim 10 including forming at least one projection on one of said second and intermediate members at the interface therebetween and at least one mating recess engaged with the projection on the other of said second and intermediate members at the interface.

14. The method of claim 10 wherein the first, second and intermediate members have curved mating respective surfaces.

15. The method of claim 10 including forming the members into tubes wherein the second member is within the first member and the intermediate member is between the first and second members.

16. The method of claim 10 wherein the first member is thermoplastic material having a different melt temperature than that of the intermediate member.

17. The method of claim 15 including forming annular ribs and mating recesses between the intermediate member and the first and second members.

18. A method of making a bearing structure comprising:

forming a first member with a first surface of a first radial dimension relative to a first axis;

forming a second member having a second surface with a second radial dimension smaller than the first radial dimension relative to a second axis;

positioning the first member relative to the second member with the first and second surfaces forming an interface region in facing spaced relation and the axes coaxial; and molding an intermediate thermoplastic journal member in situ between the first and second surfaces and which slides against at least one of the first and second members;

the first member comprising thermoplastic material having a different melt temperature than that of the intermediate member so that the first member does not melt and soften during the molding of the intermediate member.

19. A bearing structure comprising:

an outer thermoplastic tubular member having a cylindrical inner surface comprising a bore of a first diameter and having a first melt temperature;

an inner tubular member having an outer cylindrical surface with an outer diameter smaller than the first diameter and positioned within the outer member bore; and an intermediate thermoplastic tubular member molded in situ between the inner and outer tubular members and being of a second lower melt temperature than the first temperature shrunk fit to the inner member to lock the intermediate member to the inner member so that the inner and intermediate members rotate in unison when subjected to a torque between the inner and outer members and to form the intermediate member and the outer member as a respective journal and bearing in response to the torque.

20. The bearing structure of claim 19 further including a thrust ring secured to one of the intermediate and outer members and a mating recess in the other of said intermediate and outer members engaged with the ring to absorb axial thrust loads between the intermediate and outer members.

21. The bearing structure of claim 19 including projection means on one of the intermediate and inner members and recess means on the other of said intermediate and inner members mating with and engaged with the projection means for further locking the intermediate and inner members together.

22. A bearing comprising:

an inner tubular member having an outer cylindrical surface;

an outer tubular member having an inner cylindrical surface, the inner member being nested within the outer member with the surfaces juxtaposed; and an intermediate member comprising thermoplastic material injection molded insitu between the juxtaposed surfaces of the inner and outer members such that the intermediate member is shrunk-fit locked to the inner member outer surface and is slidably secured to the outer member inner surface.

23. The bearing of claim 22 wherein the inner member is metal and the outer member is thermoplastic material.

* * * * *